Dec. 26, 1933.    R. E. PARK, JR    1,941,106
MATERIAL HANDLING MACHINE
Filed Nov. 12, 1930    7 Sheets-Sheet 4

Inventor
R. E. Park Jr.
By H.B. Whitfield Att'y.

Dec. 26, 1933.  R. E. PARK, JR  1,941,106
MATERIAL HANDLING MACHINE
Filed Nov. 12, 1930   7 Sheets-Sheet 5

Inventor
R. E. Park Jr.
By J.H.B. Whitfield Atty.

Patented Dec. 26, 1933

1,941,106

UNITED STATES PATENT OFFICE 1,941,106

MATERIAL HANDLING MACHINE

Robert E. Park, Jr., Jersey City, N. J., assignor to Western Electric Company, Incorporated, New York, N. Y., a corporation of New York Application November 12, 1930
Serial No. 495,268

24 Claims. (Cl. 270—58)

This invention relates to a material handling machine, and more particularly to a machine for manufacturing electrostatic condensers.

An object of the invention is the provision of a simple and an expeditiously operable machine for arranging materials in a predetermined form.

In one embodiment of the invention as applied to the manufacture of electrostatic condensers, a plurality of supply units are located at spaced positions and in circular arrangement about a turret which is rotated intermittently for positioning stacking magazines carried thereby in receiving positions relative to the supply units, two of which supply metallic foil severed from a continuous roll to the stacking magazines, and the other units supply sheet mica simultaneously to the stacking magazine. One features of the machine is the advancement of opposite foils to have their respective ends project on opposite sides of the stack in the stacking magazine, and another feature of the invention is the arrangement to allow the application of a predetermined number of micas, depending upon the electrical characteristics of the mica; that is, if a mica is of a high electrical quality the single mica may be used, but if the mica is slightly defective then two or more micas may be required.

Other objects will be more apparent from the following detailed description when considered in connection with the accompanying drawings, wherein.

Figure 1:
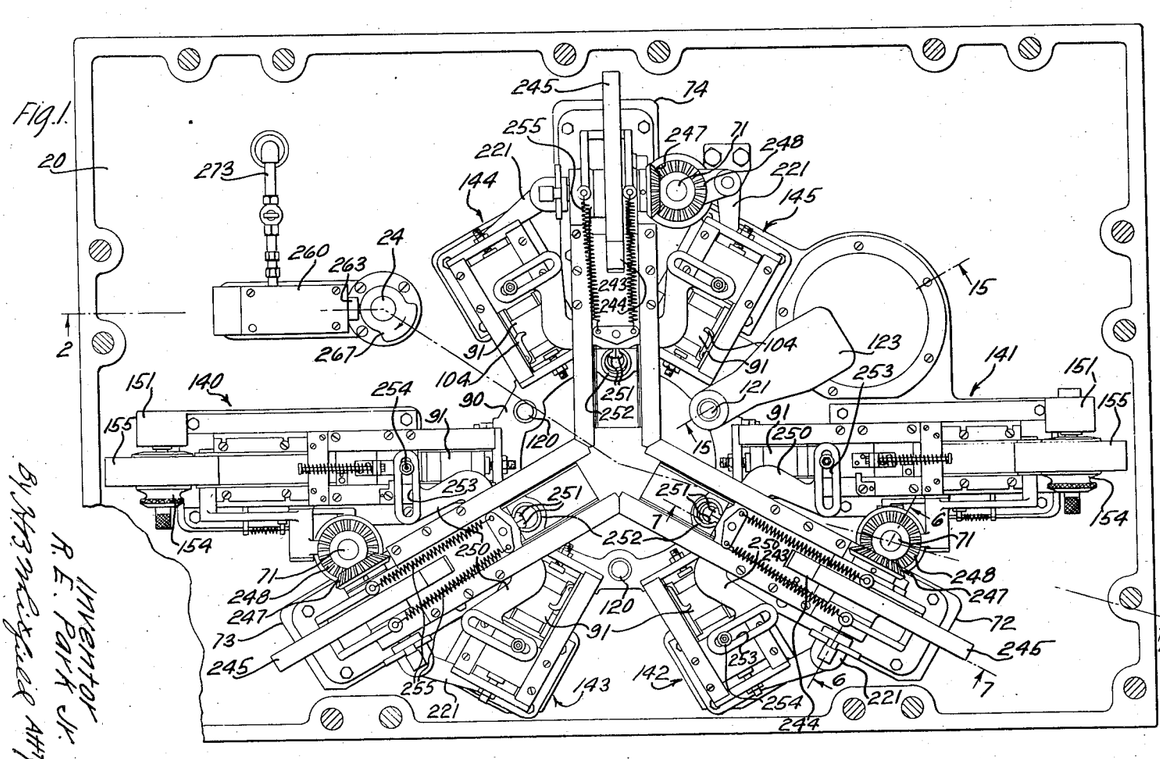
Fig. 1 is a top plan view of the machine with the cover removed.
Figure 2:
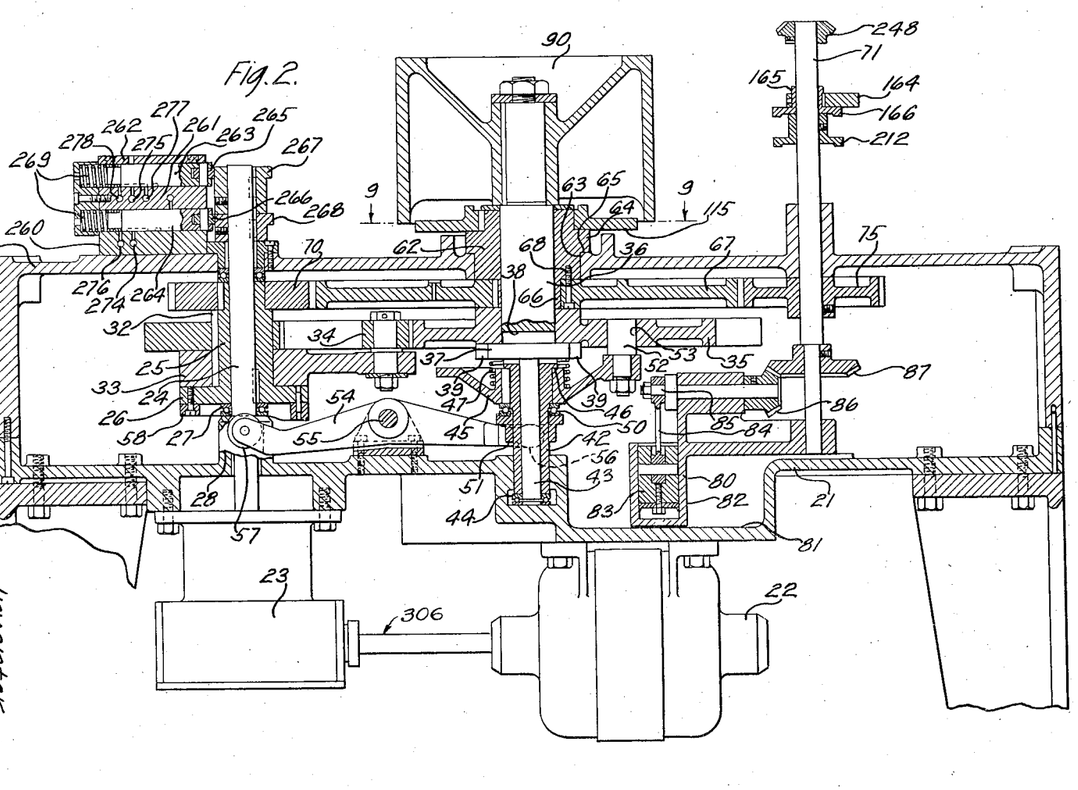
Fig. 2 is a sectional view taken substantially along the line 2—2 of Fig. 1.

Referring now to the drawings wherein like reference numerals have been employed to designate similar parts throughout the various figures, it will be observed that Figs. 1 and 2 disclose a housing 20 having a bottom wall 21 to which a driving motor 22 is secured and operatively connected to a speed reducer 23, which is also secured to bottom wall 21. Extending upwardly through bearings in the housing 20 and operatively connected to the speed reducer 23 is a drive shaft 24 having a sleeve 25 mounted thereupon and keyed thereto. The lower end of the sleeve 25 has an annular shoulder 26 integral therewith which rests upon a thrust bearing 27 disposed concentric with the drive shaft 24 and resting upon a projection 28 on the bottom wall 21. Mounted upon the sleeve 25 and fixed thereto by a key 32, is a Geneva arm 33, which rests upon the shoulder portion 26 and has a roller 34 disposed on the other end thereof and arranged to operatively connect the Geneva arm 33 with a Geneva gear 35. The Geneva gear 35 movably receives the turret shaft 36 through a central opening therein, and is operatively connected to the turret shaft by a supporting key 37 which extends laterally through a relatively large aperture 38 in the shaft 36, the ends of the key being positioned in recesses 39 in the Geneva gear. The turret shaft 36 has a hollow reduced portion 42 for receiving a supporting shaft 43, the upper end of which abuts the supporting key 37, while the lower end rests upon a thrust bearing 44. An equalizing spider 45 is mounted upon the reduced portion 42 of the turret shaft 36 in abutting engagement with a shoulder 46 and keyed to the shaft so as to move longitudinally and rotatably with the turret shaft. A spring 47 engages the supporting key 37 and tends to force the spider 45 together with the turret shaft 36 downwardly against a bearing 50 carried by a lifting collar 51. Operative connection is made between the spider 45 and the Geneva gear 35 by a plurality of spaced guide pins 52 carried by the spider and movably disposed in apertures 53 of the Geneva gear. A means for imparting vertical movement to the spider 45 and the turret shaft 36 consists of a rocking lever 54 pivotally mounted at 55 upon a bracket secured to the bottom wall 21, one end of the lever having forked projections 56 for engaging the lifting collar 51 at diametrically opposed positions. Rotatably mounted upon the other end of the lever is a cam roller 57 held by the spring 47 in engagement with a turret lifting cam 58, which is secured to the lower surface of the shoulder portion 26.

A collar 62 is rotatably disposed in an aperture 63 in a top wall of the housing 20 and has an annular flange 64 resting upon a raised portion 65 adjacent the aperture 63 and a reduced portion 66 upon which is mounted a relatively large gear 67 keyed thereto and held against displacement relative thereto by screws 68. The gear 67 meshes with a relatively small gear 70 mounted upon the sleeve 25 and keyed thereto. Disposed in spaced positions about the gear 67 are vertically extending shafts 71 for transmitting power to actuating units 72, 73 and 74, which will be described hereinafter. Gears 75 of mutually equal size are mounted upon the shafts 71 and are in mesh with the gear 67.

For the purpose of lubricating the mechanism enclosed in the housing 20, a lubricating pump 80 is positioned in a pocket 81 in the bottom wall 21 and consists of a cylinder 82 having a piston 83 disposed therein and adapted to be moved by a connecting rod 84, when movement is imparted thereto by an eccentric crank 85, the latter being operatively connected to the adjacent shaft 71 through a pinion 86 and a gear 87. Oil lines (not shown) extend to the various shafts and gears for providing them with sufficient lubricant.

Figures 12, 13:
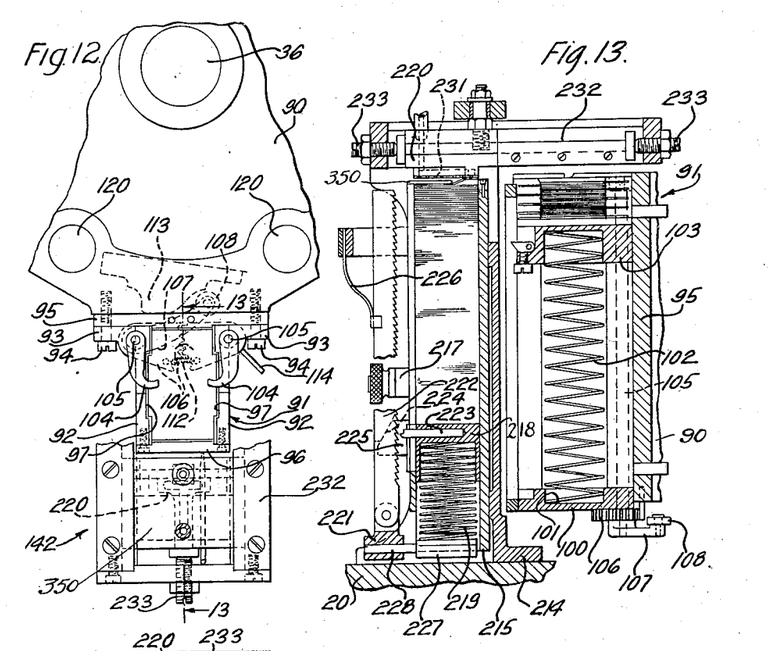
Fig. 12 is a fragmentary top plan view of a portion of a turret showing a stacking magazine carried thereby and its relation to a mica feeding unit.
Fig. 13 is a sectional view taken on the line 13—13 of Fig. 12.

Mounted upon the upper end of the turret shaft 36 is a turret 90 having secured thereto at spaced positions six stacking magazines 91 (Figs. 1, 12, 13 and 14) which are identical in construction. The stacking magazines consist of side walls 92 (Fig. 12), having outwardly extending flanges 93 through which screws 94 extend to secure the side walls together with back walls 95 to the turret 90. Front walls 96 are secured to the side walls by screws as shown in Fig. 12. Longitudinally extending recesses 97 are disposed in the side walls 92 to properly position micas therein allowing sufficient space at each end thereof for the metal foil, as will be described hereinafter. Bottoms 100 are provided for the magazines 91 and have cutaway portions 101 therein for receiving the lower ends of springs 102, the upper end of which are received in platforms 103, upon which the micas together with the metallic foil sheets are stacked. Positioned at the upper edges of the side walls 92 are retaining fingers 104 mounted upon the upper ends of rocking shafts 105 which are journaled in the side walls and extend therethrough. The lower ends of the rocking shafts 105 have gear segments 106 mounted thereupon and in mesh with each other. Mounted upon one of the rocking shafts 105 of each stacking magazine adjacent the gear segment 106 is a cam lever 107 having a roller 108 rotatably mounted on the outer end thereof, and normally held inwardly, as shown in Fig. 12, by a spring 112, the ends of which are secured to the gear segments 106. The spring 112 not only holds the cam lever 107 inwardly so that the roller 108 will be positioned to engage cams 113, but it also normally holds the gear segments 106 in such a relative position, that the retaining fingers 104 will extend inwardly beyond the recesses 97 in the side walls 92. A transversely extending handle 114 is carried by one of the gear segments 106 to provide means for manually actuating the retaining fingers 104.

Figure 9:
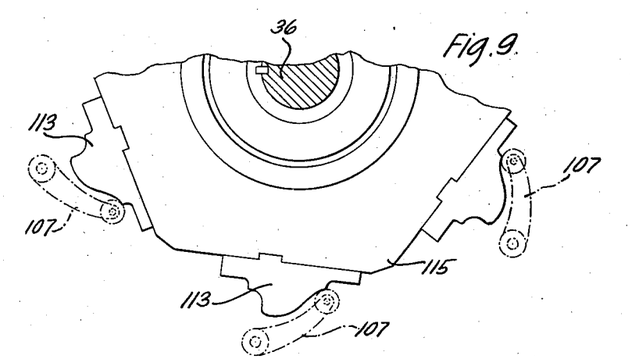
Fig. 9 is a sectional view taken on the line 9—9 of Fig. 2.
Figures 10, 11:
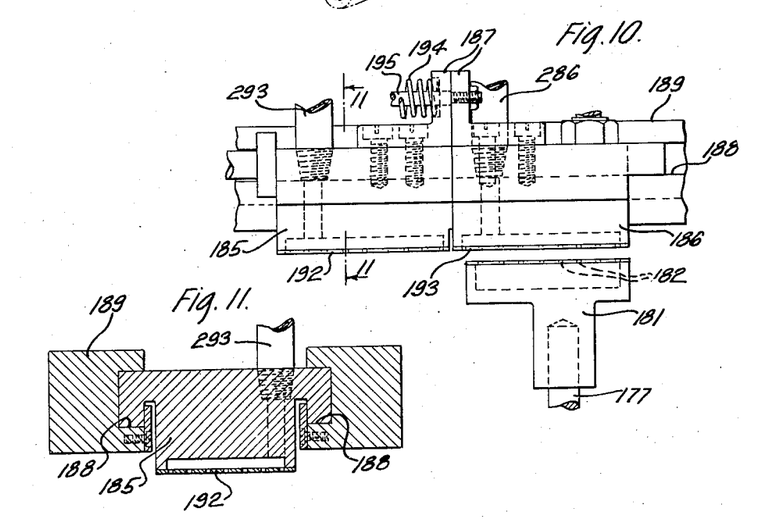
Fig. 10 is a sectional view taken on the line 10—10 of Fig. 4.
Fig. 11 is a sectional view taken on the line 11—11 of Fig. 10.

The cams 113 are mounted in spaced positions upon a cam follower 115 (Figs. 2 and 9), and are of such a contour that they will actuate the cam levers 107 at predetermined times for moving the retaining fingers 104 outwardly.

Figures 15, 16, 17:
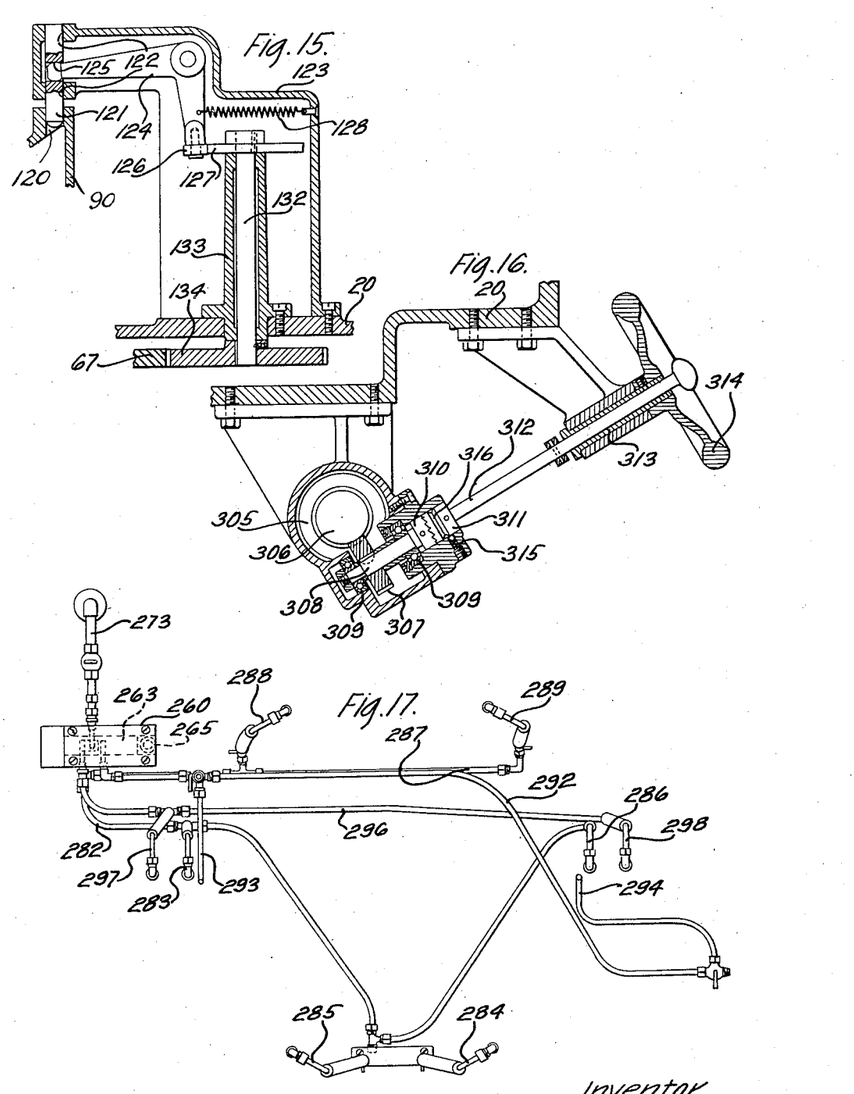
Fig. 15 is a detailed sectional view of the turret locking mechanism taken on the line 15—15 of Fig. 1.
Fig. 16 is a sectional view of the manually operated mechanism.
Fig. 17 is a plan view of the vacuum supply circuit.

Disposed at spaced positions adjacent the periphery of the turret 90 are apertures 120 arranged to receive a locking pin 121 (Figs. 1 and 15). The pin 121 is movable vertically in aligned apertures 122 in a bracket 123 mounted upon the housing 20. Pivotally mounted in the upper portion of the bracket 123 is a bell crank cam lever 124, one end of which extends into an aperture 125 in the locking pin 121, the other end having a cam roller 126 mounted thereupon and held in intimate engagement with a cam 127 by a spring 128. The cam 127 is mounted upon one end of a shaft 132 which extends downwardly through a sleeve 133 secured to and extending through the upper wall of the housing 20. The lower end of the shaft 132, that is, the end of the shaft positioned in the housing 20, has a gear 134 mounted thereupon which meshes with the relatively large gear 67.

A plurality of feeding units (Fig. 1) are mounted upon the housing 20 and positioned radially from the center line of the turret 90. Two of these feeding units, indicated generally at 140 and 141, are adapted to feed metallic foil to the stacking magazines 91 on turret. These metallic foil feeding units are diametrically opposed, and have positioned therebetween in a circumferential arrangement, mica feeding units, indicated generally at 142, 143, 144 and 145.

In view of the fact that the metallic foil feeding units 140 and 141 are substantially identical in construction, a description of the unit 141 will apply equally as well to the unit 140. Details of the metallic foil feeding unit 141 are shown in Figs. 3, 4, 5, 10 and 11, this unit consisting of a casing 150 mounted upon the housing 20 and having secured to the back wall thereof a bracket 151, the upper end of which receives a shaft 152, mounted in a bearing 153. The shaft 152 extends outwardly and has a spool 154 mounted thereupon for receiving a roll 155 of metallic foil. The metallic foil from the roll 155 is fed beneath a tensioning roller 156 and through a guide 157 which is U-shaped in cross-section, the roller 156 being carried by one end of a lever 160 and positioned adjacent arcuate shaped edges 161 of the U-shaped guide 157. A tension spring 162 having one end secured to the casing 150, and the other end secured to the lever 160, tends to draw the roller 156 down toward the housing 150. Mounted upon the other end of the lever 160 is a cam roller 163 which is held in engagement with a cam 164 (Figs. 2 and 5) the latter being adapted to actuate the lever 160, for a purpose hereinafter described. The cam 164 is mounted upon a hub 165 of a cam 166, the latter being fixedly mounted on the adjacent shaft 71. Positioned in engagement with the cam 166 is a cam roller 167, carried by a lever 168 which is mounted upon a shaft 169, the latter being journaled in the casing 150 and having a yoke 170 mounted upon the inner portion thereof. The outer ends of the yoke 170 extend through an aperture 173 in the casing 150 and engage a horizontal connecting member 174. Extending upwardly through bearings 175 and 176 formed on the housing 150 are supporting rods 177 which also extend through the horizontal member 174 and are secured thereto by a pin 178. Springs 180 are disposed concentric with the supporting rods 177 between the bearing 175 and the horizontal member 174 for urging the rods, together with the horizontal member, upwardly. A lower suction pad 181 (Fig. 1, 10) is mounted upon the upper ends of the supporting rods 177 and has a multiplicity of spaced apertures 182 in the upper wall thereof communicating with a vacuum control means hereinafter described.

Figure 3:
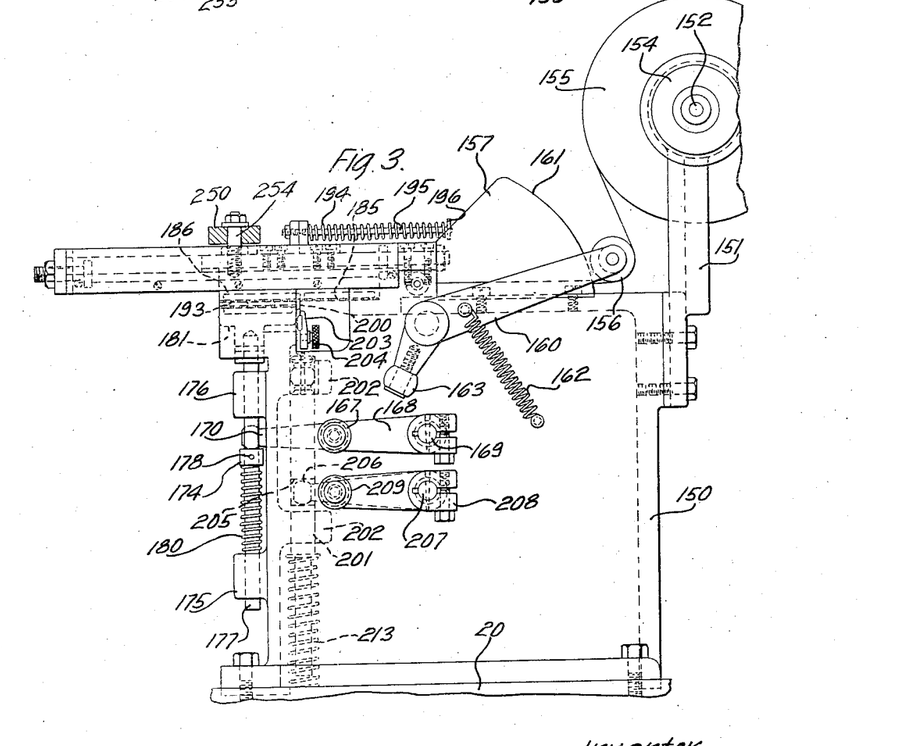
Fig. 3 is a side elevational view of one of the metallic foil supply units.

Positioned above the lower suction pads 181 are upper suction pads hereinafter termed the first upper suction pad 185 and the second upper suction pad 186. These upper suction pads (Fig. 4), are secured to each other by angular brackets 187 and are adapted to ride in tracks 188 of an inwardly extending guide 189. The upper suction pads 185 and 186 have in their lower wall a multiplicity of apertures 192 and 193 which communicate with the vacuum supply which will be described hereinafter. A spring 194 which is mounted concentric with a rod 195 and having one end carried by the angular brackets 187, while the other end is carried by a bracket 196 mounted upon the guide 189, urges the upper suction pads 185 and 186 to the left (Fig. 3).

The adjacent ends of the upper suction pads 185 and 186 are spaced sufficiently, at their lower portions, to receive a cutting blade 200 when the suction pads are in a predetermined position. The cutting blade 200 is removably secured to a vertically extending rod 201 which is slidable in bearings 202 in the casing 150. The means for removably securing the cutting blade 200 to the rod 201 consists of a clamp 203 which is forced in close engagement with the cutting blade by a thumb screw 204. An aperture 205 is disposed in the vertically extending rod 201 for receiving one end of a lifting lever 206, the other end of the lever being mounted upon a shaft 207 journaled in the casing 150 and having one end extending therethrough to receive the cam lever 208, which is adjustably secured thereto. The free end of cam lever 208 (Fig. 5), has a cam roller 209 mounted thereupon and held in engagement with a cam 212 by a spring 213 (Fig. 3), the cam being mounted upon the adjacent shaft 71 beneath the cam 166.

Figure 14:
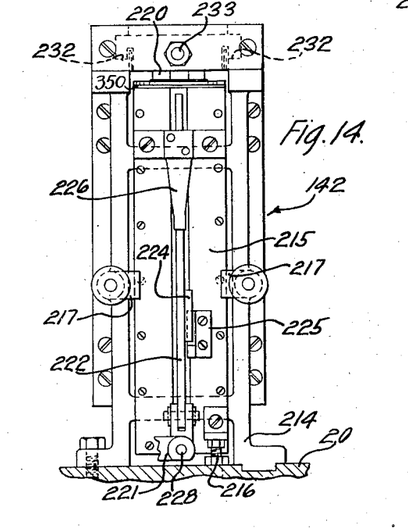
Fig. 14 is a rear elevational view of the mica supply unit shown in Fig. 12.

The mica feeding units 142, 143, 144 and 145 are substantially identical in construction, and a description of one as shown in Figs. 12, 13 and 14 will apply equally as well to them all. The feeding unit 142 comprises a vertically extending supporting bracket 214 which is mounted upon the housing 20 and arranged to receive a magazine 215. Disposed adjacent the lower end of the magazine 215 is an angular stop member which rests upon an adjusting screw 216, disposed in the top wall of the housing 20 and held in adjusting position by a lock nut for varying the position of the magazine 215 relative to the housing 20. The supporting bracket 214 is U-shaped in horizontal cross section and has inwardly extending retaining clamps 217 secured to the side walls thereof for holding the magazine 215 in place. Disposed in the magazine 215 is a platform or follower 218 which is urged upwardly by a spring 219 to position micas at the upper end of the magazine against the pile top stop 350 where they may be attracted by vacuum in a suction pad 220. To relieve the topmost mica from the pressure of the spring 219 when attracted by the vacuum in the suction pad 220 a reciprocable arm 221 which has a vertically extending rack 222 pivotally mounted thereon, the teeth of which are positioned to engage a pin 223 extending laterally from the platform 218, is actuated. The actuation of the reciprocable arm 221 and its operative connection with the proper actuating unit will be described hereinafter. Mounted upon the rack 222 is a cam 224 positioned to engage a cam 225, which is fixed to the magazine 214, during the downward movement of the rack 222, the rack being pivoted inwardly toward the magazine by a spring 226 when moved upwardly. A bearing block 227 is slidable in the lower portion of the magazine 214 for supporting the spring 219 and receives a pin 228 which is carried by the arm 221.

The suction pad 220 has a plurality of apertures 231 in a lower wall thereof which communicate with a vacuum supply described hereinafter. A track 232 is provided on each side of the suction pad 220 for movably supporting the suction pad and allowing it to move from a position above the magazine 215 to a position above one of the stacking magazines 91 carried by the turret 90. Adjustable stops 233 limit the movement of the suction pad 220 and properly position the suction pad after each movement thereof.

By viewing Fig. 1, it will be observed that the actuating units 72, 73 and 74 are positioned between pairs of feeding units; that is, the actuating unit 72 is positioned between the feeding units 141 and 142, the actuating unit 73 is positioned between the feeding units 143 and 140, and the actuating unit 74 is positioned between the feeding units 144 and 145. These actuating units are also substantially identical in construction, and a description of one will apply equally well to them all.

Figures 6, 7:
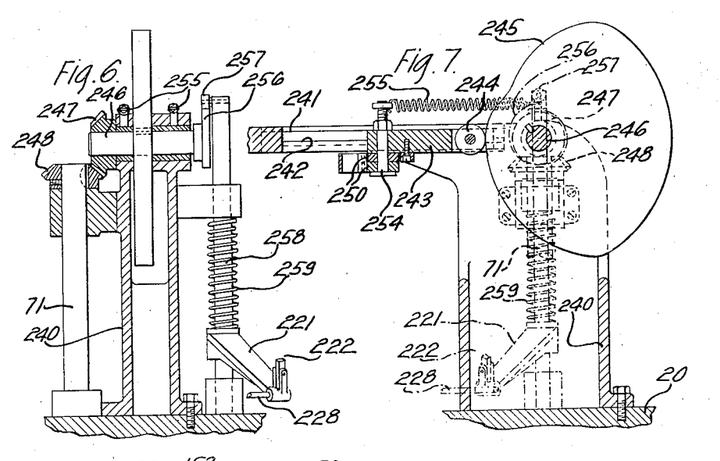
Fig. 6 is a sectional view taken on the line 6—6 of Fig. 1.
Fig. 7 is a sectional view taken substantially along the line 7—7 of Fig. 1.
Figure 8:
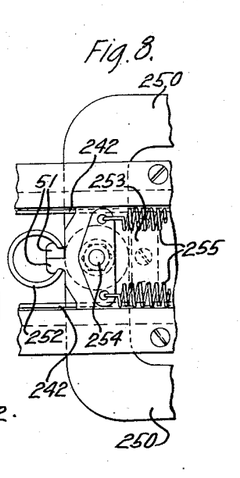
Fig. 8 is an enlarged fragmentary top plan view of one of the actuating units.

In Figs. 6, 7 and 8 are shown details of the actuating unit 72, which comprises a supporting bracket 240 having inwardly extending guides 241 which extend to and are secured to the guides of the other actuating units 73 and 74 (Fig. 1). Disposed between the guides 241 and carried by tracks 242 in the guides is a cam block 243 having a cam roller 244 disposed in a recess formed therein. An actuating cam 245 is mounted upon a shaft 246, which is journaled in bearings of the bracket 240. Mounted upon one end of the shaft 246 is a bevelled gear 247, meshing with a bevelled gear 248 which is mounted upon the adjacent shaft 71, for transmitting power to the cam 245 from the relatively large gear 67. Pivotally mounted at the inner end of the cam block 243 are actuating arms 250 (Figs. 1 and 8) which have beaded lugs 251 urged toward each other by a circular spring 252 to urge the actuating arms 250 outwardly. Elongated apertures 253 (Figs. 1 and 8), extend at a right angle to the tracks 188 and 232 in which the suction pads 185 and 186 and the suction pad 228 are respectively disposed. These suction pads are connected to the actuating arms by pivot bolts 254, or the like, extending through the elongated apertures 253 of the actuating arm 250. Springs 255 hold the cam roller 244 in constant engagement with the cam 245. Mounted upon the other end of the shaft 246 is a cam 256 which engages a roller 257 on a reciprocable bar 258. The arm 221 is mounted upon the bar 258 and is urged downwardly with the bar, by a spring 259.

The vacuum control system is illustrated in Fig. 17 and consists of a valve casing 260 mounted upon the housing 20 (Fig. 2) adjacent the drive shaft 24 and is provided with a central partition 261 and a cover 262 forming compartments for receiving slide valves 263 and 264. The slide valves 263 and 264 have cam rollers 265 and 266, respectively, disposed in recesses in their outer ends and held in close engagement with cams 267 and 268, respectively, by springs 269. The cams 267 and 268 are mounted upon the upper end of the drive shaft 24 and are adapted to actuate the valves 263 and 264. A vacuum line 273 (Figs. 1 and 17) communicates with vacuum ports 274 and 275 which are disposed in the bottom wall and the partition of the casing, respectively, for providing communication between the vacuum supply line 273 and the valves 263 and 264. A vacuum port 276 communicates with the compartment in which the valve 264 is disposed and vacuum ports 277 and 278 are disposed in the partition 261, the vacuum port 277 communicating with the valve 263, while the vacuum port 278 normally communicates with the compartment containing the valve 263 but is arranged to also communicate with the valve 263. Disposed in communication with the vacuum port 276 is a vacuum line 282 having a branch line 283 connected to the second upper suction pad 186 of the metallic foil feeding unit 140. The vacuum line 282 has also branch lines 284 and 285 communicating with the suction pads 220 of the mica supply units 242 and 243, respectively, and communicates with the second upper suction pad 186 of the metallic foil feeding unit 141 as indicated at 286. The vacuum line 287 also communicates with the vacuum port 276 and has branch lines 288 and 289 which communicate with the suction pads 220 of the mica supply units 144 and 145, respectively. The vacuum port 277 has a vacuum line 292, which extends to the lower suction pad 181 of the metallic foil feeding unit 140, as indicated at 293, and extends to and communicates with the lower suction pad 181 of the metallic foil feeding unit 141 as indicated at 294. The vacuum port 278 has a vacuum line 296 communicating with the first upper suction pad 185 of the metallic foil feeding unit 140 as indicated at 297 and is connected to and communicates with the first upper suction pad of the metallic foil feeding unit 141 as indicated at 298.

In Fig. 16 a mechanism is shown for manually actuating the device, the purpose of this mechanism being to provide a means whereby the mechanism may be actuated at a desired slow speed to properly position the units for the satisfactory removal of the stacked material, and for the reconditioning of the feeding units when the material has been removed therefrom. This mechanism consists of a worm gear 305 mounted upon a motor shaft 306 which connects the motor 22 with the speed reducer 23 and having a worm 307 meshing therewith. The worm 307 is mounted upon a stub shaft 308 which is journaled in bearings 309 and has a toothed clutch member 310 fixed to the upper end thereof. A companion clutch member 311 is fixed to one end of an actuating rod 312 which is movably disposed in a hub 313 of a hand wheel 314. A spring pressed ball latch 315 is adapted to be received in an annular groove 316 in the clutch member 311 for holding this member out of engagement with the clutch member 310.

Figure 4:
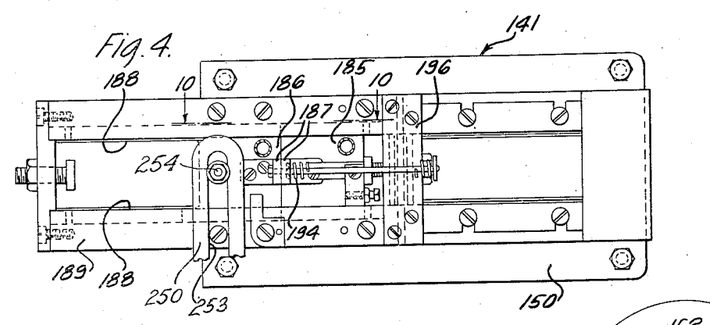
Fig. 4 is a top plan view of the unit shown in Fig. 3.
Figure 5:
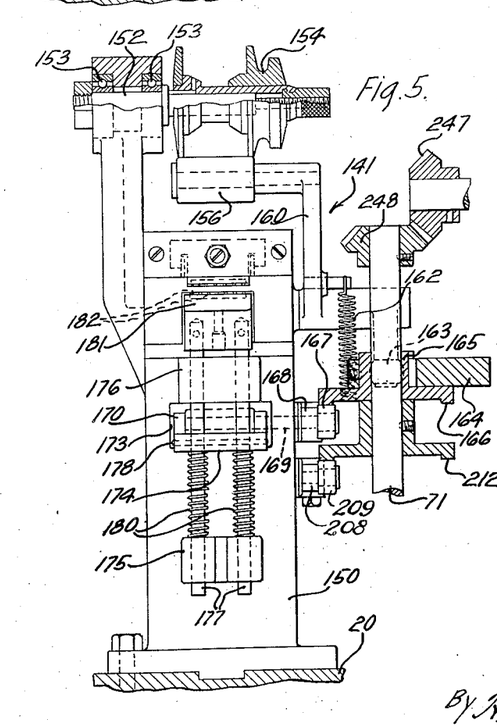
Fig. 5 is a front elevational view of the unit shown in Fig. 3, portions thereof being shown in section.

In preparing the machine for operation, the metallic foil is fed from the spools 156 over the guide 157 and into engagement with the suction pad 185 of each of the units 140 and 141, the magazines 221 of the mica feeding units 142 to 145, inclusive, are filled with micas and secured in place by the horizontal bars 224, a valve in the vacuum supply line 273 is turned on and the motor 22 is energized. The energization of the motor 22 causes a rotation of the drive shaft 24, which actuates the Geneva mechanism, including the Geneva arm 33 and the Geneva gear 35, for imparting an intermittent rotary motion to the turret 90 to move the stacking magazines 91, carried thereby, into positions adjacent the feeding units. During this intermittent movement of the turret, the relatively large gear 67 is being rotated continuously to actuate the feeding units for disposing a sheet of metal foil or a sheet of mica into the respective stacking magazines. The feeding units 140 to 145, inclusive, are actuated simultaneously, but upon considering the operation of these units, attention is drawn first to the metal foil feeding unit 141 which is actuated by the cams 164, 166 and 212, upon the adjacent shaft 71. The valve 263 (Fig. 2) is actuated to provide communication between the first upper suction pad 185 and the vacuum supply line 273 so as to hold the end of the metallic foil when the upper suction pads 185 and 186 are moved inwardly. This inward movement of the upper suction pads is effected by the actuation of the cam 245 of the adjacent actuating unit 72, so as to move the cam block 243, together with the actuating arm 250, which is operatively connected to the upper suction pad 185 and 186, thus moving the upper suction pad 185, together with the metallic foil, to a position above the lower suction pad 181. When this position has been reached, the lower suction pad 181 is moved upwardly by the springs 180, due to the movement of the cam 166 upon the cam roller 167, and the valve 263 is moved outwardly to the position shown in Fig. 2 to allow communication between the vacuum lines 292 and 294 through the vacuum ports 275 and 277. These vacuum lines communicate with the lower suction pad 181 drawing the metallic foil in close engagement with the perforated surface of the lower suction pad, while the vacuum to the suction pad 185 is simultaneously cut off due to the outward movement of the valve 263. The metallic foil is thus held by the lower suction pad 181, while the upper suction pads 185 and 186 are moved outwardly to their original positions shown in Figs. 3 and 4. During the movement of the suction pads 185 and 186 to their outer positions, the roller 156 (Fig. 3), which rides upon the ribbon of metallic foil, draws the excess foil downwardly and removes an additional amount from the roll 155, to allow for the next inward movement of the upper suction pads. During the period of rest of the upper suction pads 185 and 186 in the positions shown in Figs. 3 and 4, the cutting blade 200 is moved upwardly into the recess formed between the two upper suction pads so as to sever the portion thereof, which is held by the lower suction pad 181, from the remainder of the ribbon, the adjacent end of the ribbon being held by the upper suction pad 185 due to vacuum. The actuation of the cutting blade 200 is controlled by the cam 212 riding over the cam roller 209, allowing the lever 208 together with the actuating lever 206 to be moved upwardly by the spring 213, which urges the rod 201 upwardly with the cutting blade 200. The cutting blade 200 is lowered in sufficient time to allow the upper suction pads 185 and 186 to again move inwardly; however, before the next inward movement of the suction pads 185 and 186, the lower suction pad 181 is again moved upwardly to position the sheet of metallic foil carried thereby adjacent the upper suction pad 186, and while in this position the valve 263 is again actuated to simultaneously connect the vacuum system to the upper suction pad 186 and disconnect the vacuum system from the lower suction pad 181, thus transferring the sheet of metallic foil from the lower suction pad 181 to the upper suction pad 186. At this step of the operation, the severed sheet of metallic foil is carried by the upper suction pad 186 and the end of the metallic ribbon is carried by the upper suction pad 185, and during the next inward movement of the cam block 243 of the actuating unit 72, due to the movement of the cam 245, the severed sheet of metallic foil is positioned above the adjacent stacking magazine 91 on the turret 90, and the end of the metallic ribbon is positioned above the lower suction pad 181. When the vacuum system is disconnected from the upper suction pad 186, the metallic sheet carried thereby is dropped into a stacking magazine 91, which has been moved upwardly with the turret 90 to receive the same. The upward movement of the turret is effected by the actuation of the rocking lever 54 due to the operative engagement of the cam 58 therewith for moving the spider 45 together with the turret shaft 36, the turret 90 and the stacking magazines 91 upwardly. When the stacking magazines 91 are disposed in this upward position, the follower 115, during its continuous rotation, moves one of the cams 113 into engagement with the cam roller 108 of the actuating lever 107 to rotate the shafts 105 simultaneously by the aid of the gear segments 106 to move the retaining fingers 104 outwardly from underneath the metallic sheet which is simultaneously released by the suction pad 186, whereupon the magazine 91 continues to move upwardly carrying the fingers 104 above the metallic sheet, after which the fingers move inwardly to hold the metallic sheet in the magazine. During the operation of the metallic foil feeding unit 141, the end of the ribbon is held by the suction pad 185, moved inwardly to a position above the lower suction pad 181 where it is released, simultaneously drawn to and held by the suction pad 181 due to vacuum and held in this position until the suction pad 185 again reaches its outermost position, as shown in Figs. 3 and 4. The end of the metallic ribbon carried by the suction pad 181 is moved into close engagement with the suction pad 186 where it is released by the suction pad 181, due to the disconnection of the vacuum system therefrom and simultaneously attracted by the suction pad 186 due to the connection of the vacuum system thereto, and as the portion of the metallic ribbon adjacent the suction pad 185 is held in close engagement therewith due to the vacuum, the cutting blade 200 is actuated to sever the portion of desired length from the metallic ribbon. When the severed sheet of metallic foil is disposed in the stacking magazine, the inner edge thereof is disposed adjacent the inner edge of the stacking magazine.

During each intermittent movement of the turret 90, the locking pin 121 (Fig. 15) is held in its uppermost position, free of the turret 90, by the cam 127, and during the time in which the turret is at rest, the pin 121 is moved into the adjacent aperture 120 and held in this position until a time just prior to the next intermediate movement of the turret. In this manner the turret is locked against movement during the period of rest and the stacking magazines carried thereby are properly positioned beneath the material feeding units.

After the next intermittent movement of the turret 90, the stacking magazine, into which the sheet of metallic foil was disposed at the first position, is disposed adjacent the mica feeding unit 142. While at this position vacuum is applied to suction pad 220 (Fig. 13) of the mica feeding unit 142 so as to attract the topmost sheet of mica in the magazine 214. This sheet of mica is relieved from the pressure of the spring 219 against the pile top stop 350 by the downward movement of the rack 222, which let it be assumed for the purpose of illustration, is in the uppermost position ready to be moved downwardly. The downward movement of the rack 222 is caused by the spring 259, when released by the cam 256, overpowering the spring 219 and moving the arm 221, the rack 222 and the platform 218 downwardly, the platform being connected to the rack by the pin 223. The bearing block 227 is also moved downwardly to relieve the pressure of the spring 219. During the downward movement of the platform 218 to relieve the mica of the pressure the unit 72 is actuated and the suction pad 220 is moved with the mica to a position above the stacking magazine 91. After the mica is removed from the magazine 215 the cam 224 rides upon the cam 225, thus forcing the rack 222 free of the pin 223 against the spring 226. During the inward movement of the suction pad 220, the follower 115 is advanced in its rotative movement sufficiently to move the next successive cam 113, carried thereby, into engagement with the roller 108 of the actuating lever 107, to move the retaining fingers 104 of the stacking magazine outwardly, allowing the sheet of mica, when released by the suction pad 220, to enter the stacking magazine 91, where it will be held in place by the retaining fingers 104, which will at that time be released and drawn into retaining positions by the spring 112, in the same manner as described above in connection with the metallic sheet. In a similar manner, another sheet of mica is disposed in the stacking magazine after the next intermittent movement of the turret and the stacking magazines carried thereby, due to the actuation of the mica feeding unit 143. The sheet of mica is removed from the magazine 214 of the mica feeding unit 143 by the suction pad 220 thereof, and moved to a position above the stacking magazine, which has previously received the sheet of metallic foil and the other sheet of mica. This second sheet of mica is released, due to the disconnection of the vacuum from the suction pad 220, and received in the magazine 91, where it is held in place by the retaining fingers 104, which have again been moved outwardly due to the actuation of the lever 107 by the cam 113 of the follower 115, while a sheet of mica is being disposed in the magazine 91, and the fingers 104 are then allowed to be moved inwardly after the releasing of the sheet of mica by the vacuum pad 220.

After the next intermittent movement of the turret, the stacking magazine carried thereby, which has received sheets of material from the three preceding positions, is disposed adjacent the metallic foil feeding unit 140 where it will receive a sheet of foil therefrom. The construction and actuation of the unit 140 is substantially identical to that of the unit 141 with the exception of the positioning of the severed sheet of foil, within the stacking magazine. The suction pads 185 and 186 of the unit 140 are operatively connected to the actuating unit 73 so that the suction pad 186 carrying the severed sheet of metallic foil will position the sheet of metallic foil in the stacking magazine 91 in such a manner that the outer edge thereof will be disposed adjacent the outer edge of the stacking magazine. At the next two positions into which the stacking magazine 91 is moved, sheets of mica are disposed therein, and held in place by the retaining fingers 104. This illustrates one complete cycle of the turret 90 and the stacking magazines carried thereby. During each period in which the turret and the stacking magazines are at rest, the units 140 to 145, inclusive, are actuated simultaneously by the simultaneous actuation of the units 72, 73 and 74, for feeding material to the stacking magazines simultaneously. The intermittent movement of the turret 90 to position the stacking magazines 91 beneath the feeding units 140 to 145, inclusive, provides a proper assortment of the sheets of material within the stacking magazines and the proper positioning of the sheets of the metallic foil therein in staggered relation.

The vacuum supply system shown in Fig. 17 is made effective at predetermined intervals during the actuation of the device to cause the various suction pads of the material feeding units to attract material at desired times and to release the material at predetermined times as described in the foregoing. In view of the fact that the mica feeding units 142 to 145, inclusive, are actuated simultaneously, the valve 264 (Fig. 2) is actuated to turn on the vacuum to the suction pads 220 of the mica feeding units 142 to 145, inclusive, simultaneously. The valve 263 is also actuated to render the respective suction pads 181, 185 and 186, of the metallic foil feeding units 140 and 141 effective or ineffective simultaneously. Even though additional operations are required of the units 140 and 141; that is, the removing of a predetermined portion of foil from the roll 155, and cutting the desired portion of foil therefrom, the severed sheet of foil is positioned upon the inner suction pad 186 ready to be moved inwardly simultaneously with the inward movement of the suction pads 220 of the mica feeding units 142 to 145, inclusive, so that the metallic foil and mica sheets will be fed to the stacking magazines 91 simultaneously.

If it is desired to actuate the device relatively slowly in order to position the various units in a desired relation, the circuit to the motor 22 may be opened and the machine may be actuated through the mechanism shown in Fig. 16. Operative engagement may be made between the hand wheel 314 and the shaft 306 by moving the connected rod 312 inwardly to position the clutch member 316 in operative engagement with the clutch member 310, thus causing rotation of the shaft 306 by the rotation of the hand wheel 314. In this manner the device may be actuated manually.

Even though this machine is defined as handling metallic foil and mica, it is to be understood that the machine may be used for handling other materials, and the invention should be limited only to the scope of the appended claims.

What is claimed is:

1. In a material handling machine, a material supply magazine, a plurality of material feeding units, a stacking magazine, means for successively positioning said stacking magazine adjacent said material feeding units, means for actuating said material feeding units for disposing material in said stacking magazine, and means for retaining the material in said stacking magazine.

2. In a material handling machine, a plurality of stacking magazines, a material supply magazine, a material feeding means, and means for successively positioning said stacking magazines in operative relation with said material feeding means.

3. In a material handling machine, means for advancing material, means associated with said advancing means for cutting portions from the material, a material receiving member, and means for disposing the portions of material into said material receiving member during the advancing of the material.

4. In a material handling machine, means for advancing material, means for holding the material in the advanced position, means for cutting a portion from the material, means for advancing the portion of material simultaneously with the advancing of the material.

5. In a machine for forming electrostatic condenser stacks, material receiving members, means for feeding a sheet of metallic foil to one of said material receiving members, a mica supply magazine, means for feeding a sheet of mica from the magazine to another of said material receiving members, and means for actuating said metallic foil feeding means and said mica feeding means simultaneously.

6. In a machine for forming electrostatic condenser stacks, a material supply magazine, a conveying means, a receiving magazine carried by said conveying means, a plurality of material feeding members, means for imparting intermittent movement to said conveying means for positioning said receiving magazine adjacent said material feeding members, and means for actuating said material feeding members for disposing material in said material receiving magazine.

7. In a machine for forming electrostatic condenser stacks, a conveying means, a receiving magazine carried by said conveying means, a plurality of material feeding members, means for imparting intermittent movement to said conveying means for positioning said receiving magazine adjacent said material feeding members, means for actuating said material feeding members for disposing material in said receiving magazine, and means carried by said receiving magazine for holding the material therein.

8. In a machine for forming electrostatic condenser stacks, a material supply magazine, a conveying member, stacking magazines carried by said conveying member, a plurality of material feeding units, means for imparting intermittent movement to said conveying member for moving said stacking magazines adjacent said material feeding units, actuating units, and means whereby said actuating units may actuate a plurality of said material feeding units for disposing material in said stacking magazines.

9. In a machine for forming electrostatic condenser stacks, a housing, a material supply magazine thereon, a conveying member movably disposed upon said housing, material receiving members carried by said conveying member, a plurality of material feeding units disposed upon said housing, actuating units disposed upon said housing in operative relation to said material feeding units, and mechanism disposed in said housing for imparting intermittent movement to said conveying member and said material receiving members carried thereby and for imparting movement to said actuating units for actuating said material feeding members for disposing materials in said material receiving members.

10. In a machine for forming electrostatic condenser stacks, a conveying member, material receiving members carried by said conveying member, means for disposing material in said material receiving members, retaining members carried by said material receiving members, and means for actuating said retaining member for allowing the material to be disposed in said material receiving members and for retaining the material in said material receiving members when said actuating means is released.

11. In a machine for forming electrostatic condenser stacks, a material supply magazine, a conveying member, material receiving members carried by said conveying member, a material feeding unit, means for imparting intermittent movement to said conveying member and said material receiving members for moving said material receiving members successively into operative relation to said material feeding means, and means for locking said conveying member against movement.

12. In a material handling machine, a plurality of material feeding members, a material receiving member, and means for actuating said material feeding members for stacking material in said material receiving member in staggered relation.

13. In a machine for forming electrostatic condenser stacks, means for holding material, a material advancing means, means whereby the material may be attracted and thereby transferred to said material advancing means, and means for actuating said material advancing means for advancing the material.

14. In a material handling machine, means for holding material, means for advancing the material, means controlled by suction for attracting and thereby transferring the material to said material advancing means, and means for actuating said material advancing means for advancing the material.

15. In a machine for forming electrostatic condenser stacks, a housing, a mica sheet supply magazine, a conveying member movably disposed upon said housing, material receiving members carried by said conveying member, means for feeding a sheet of metallic foil to one of said material receiving members and for feeding a sheet of mica from the magazine to another of said material receiving members, said means comprising a plurality of material feeding units disposed upon said housing, actuating units disposed upon said housing in operative relation to said material feeding units, mechanism disposed in said housing for imparting intermittent movement to said conveying member and said receiving members carried thereby and for imparting movement to said actuating units for actuating said material feeding members for disposing material in said material receiving members.

16. In a machine for forming electrostatic condenser stacks, a rotary turret having a plurality of stacking magazines thereon, a plurality of mica sheet supply magazines, a plurality of metal foil supply means, first transfer means to transfer mica sheets from the supply magazines to the stacking magazines, and second transfer means to transfer portions of metal foil from the supply means to the stacking magazines.

17. In a machine for forming electrostatic condenser stacks, a rotary turret having a stacking magazine thereon, a mica sheet supply magazine associated therewith, a metal foil supply means, means to transfer mica sheets from the supply magazine to the stacking magazine, and means to transfer portions of metal foil from the supply means to the stacking magazine.

18. In a material handling machine, a first material storage and supply means, a second material storage and supply means, material receiving means movable into position adjacent to the first and second supply means alternately, means to transfer material from the first supply means to the receiving means, and means to transfer material from the second supply means to the receiving means.

19. In a material handling machine, a first material storage and supply means, a second material storage and supply means, material receiving means movable into position adjacent to the first and second supply means alternately, means to transfer material from the first supply means to the receiving means, means to transfer material from the second supply means to the receiving means, and means to move the receiving means and to actuate the two transfer means in step with each other.

20. In a machine for forming electrostatic condenser stacks, a rotary turret having a stacking magazine thereon, a mica sheet supply magazine associated therewith, a metal foil supply means, means to transfer mica sheets from the supply magazine to the stacking magazine, means to transfer portions of metal foil from the supply means to the stacking magazine, and means to rotate the turret and to actuate the two transfer means in step with each other.

21. In a machine for forming electrostatic condenser stacks, a supply magazine to hold a plurality of mica sheets, a device to hold a roll of metal foil, a stacking magazine movable into position adjacent to the supply magazine and the device alternately, means to transfer mica sheets from the supply magazine to the stacking magazine, means to cut off and transfer portions of metal foil from the device to the stacking magazine, and means to actuate the stacking magazine and the mica transfer means and the foil cutting and transfer means in step with each other.

22. In a machine for handling two kinds of material, a first supply means to hold a supply of one kind of material, a second supply means to hold a supply of another kind of material, a receiving means movable into position adjacent to the first and second supply means in turn, a first transfer means to transfer portions of material from the first supply means to the receiving means, a second transfer means to transfer material from the second supply means to the receiving means, and means to move the receiving means and to actuate the two transfer means in step with each other.

23. In a material handling machine, a first material storage and supply means, a second material storage and supply means, material receiving means, means to transfer material from the first supply means to the receiving means, and means to transfer material from the second supply means to the receiving means.

24. In a material handling machine, a first material storage and supply means, a second material storage and supply means, material receiving means, means to transfer material from the first supply means to the receiving means, means to transfer material from the second supply means to the receiving means, and means to effect relative displacement of the receiving means and the two supply means.

ROBERT E. PARK, Jr.